Sept. 17, 1940.　　　　E. S. HINELINE　　　　2,215,370
RANGE FINDER
Filed March 15, 1939　　　3 Sheets-Sheet 1

INVENTOR.
Eidson S. Hineline
BY
his ATTORNEYS

Sept. 17, 1940.  E. S. HINELINE  2,215,370
RANGE FINDER
Filed March 15, 1939   3 Sheets-Sheet 2
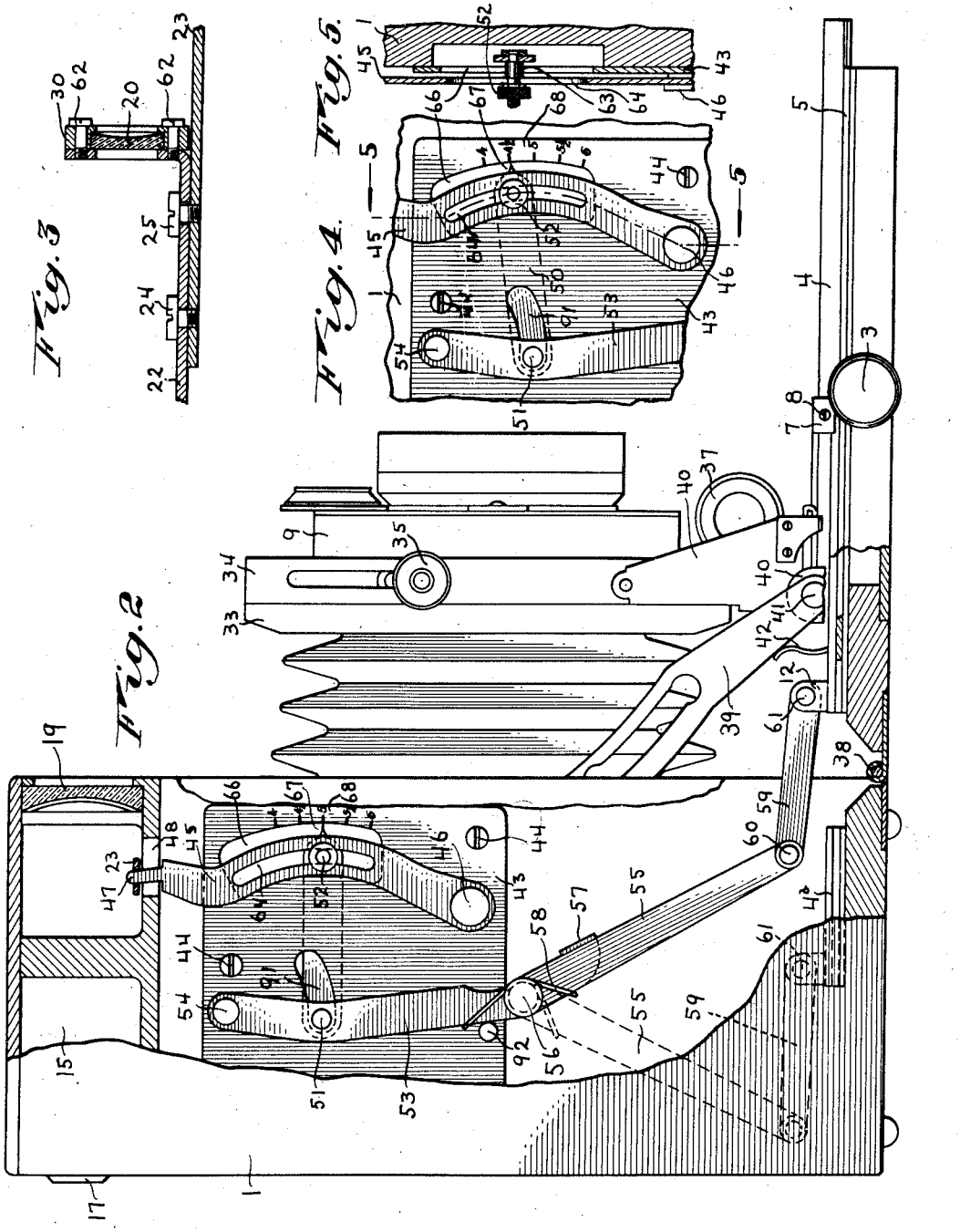
INVENTOR.
Edson S. Hineline
BY
his ATTORNEYS Sept. 17, 1940.    E. S. HINELINE    2,215,370
RANGE FINDER
Filed March 15, 1939    3 Sheets-Sheet 3
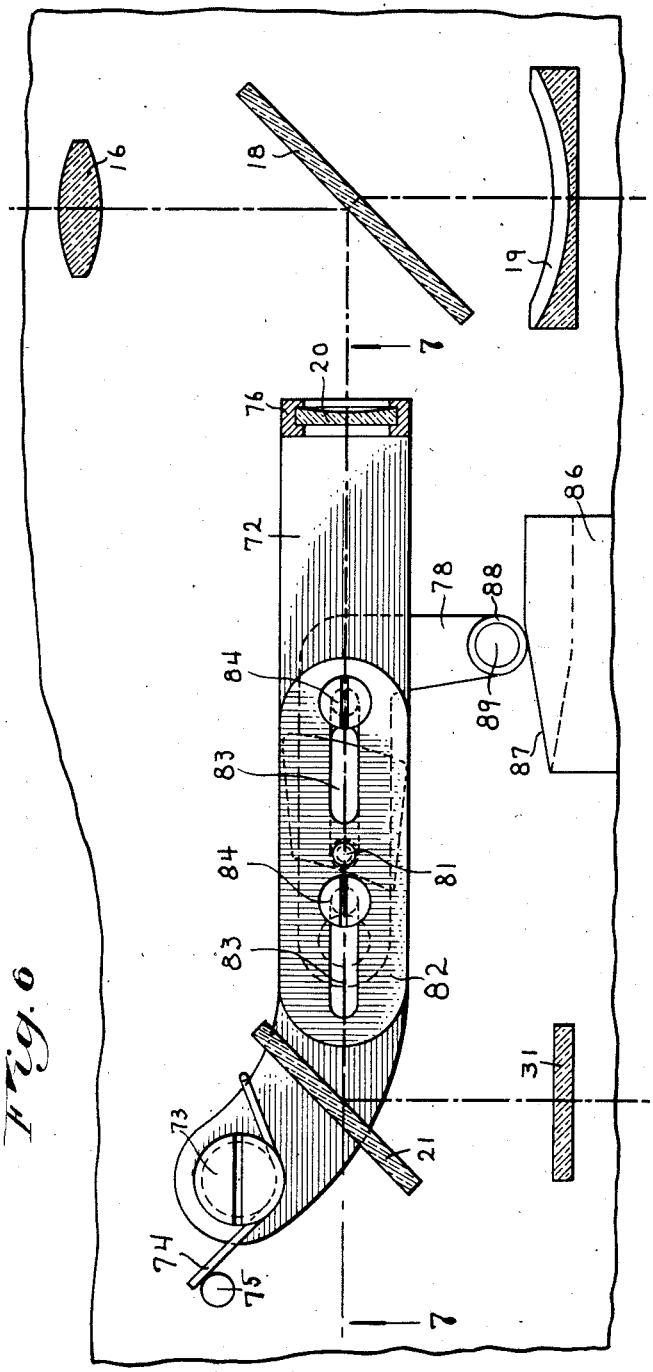
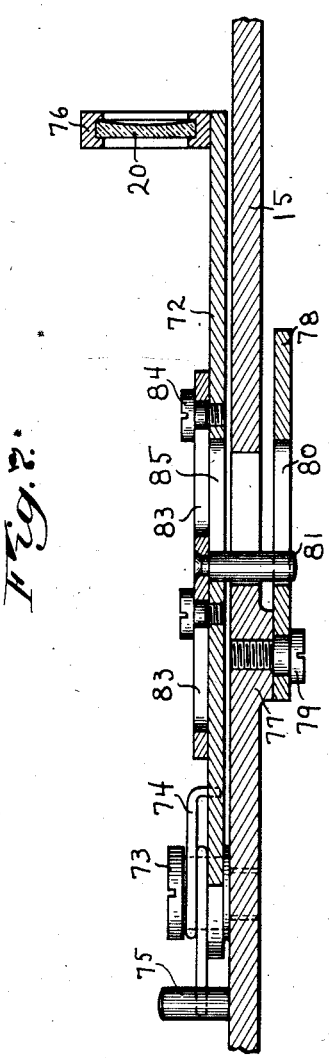
INVENTOR.
Edson S. Hineline
BY
his ATTORNEYS Patented Sept. 17, 1940

2,215,370

UNITED STATES PATENT OFFICE 2,215,370

RANGE FINDER

Edson S. Hineline, Rochester, N. Y., assignor to The Folmer Graflex Corporation, Rochester, N. Y., a corporation of Delaware Application March 15, 1939, Serial No. 262,012

13 Claims. (Cl. 95—44)

This invention relates to range finders for photographic purposes and more particularly relates to improved means for operatively connecting the objective lens supporting means with the range finder, particularly when the latter is built into the camera as a part thereof and acts as a combined range and view finder.

In order that the principle of the invention may be readily understood, I have disclosed two embodiments of the invention in the accompanying drawings wherein—

Fig. 2 is a side elevation, with parts of the camera casing broken away, taken on the line 2—2 of Fig. 1 and looking from the far side of said figure, to show the range finder coupling mechanism and its relation to the camera parts, the coupling mechanism being adjusted for use with a 5" lens;

Fig. 3 is a detail in section of a part of the construction shown in Fig. 1, taken on the line 3—3 thereof;

Fig. 4 is a fragmentary detail of Fig. 2 showing the range finder coupling mechanism adjusted for a 4½" lens;

Fig. 5 is a vertical section of Fig. 4, taken on the line 5—5 thereof, showing the coupling or connections between the range finder coupling links;

Fig. 6 is a top plan view of the range finder on a larger scale, showing an alternative means for controlling the functioning parts; and Fig. 7 is a longitudinal section taken through Fig. 6 on the line 7—7 thereof, showing the means for providing for an adjustment of the range finder tracking mechanism.

Figure 1:
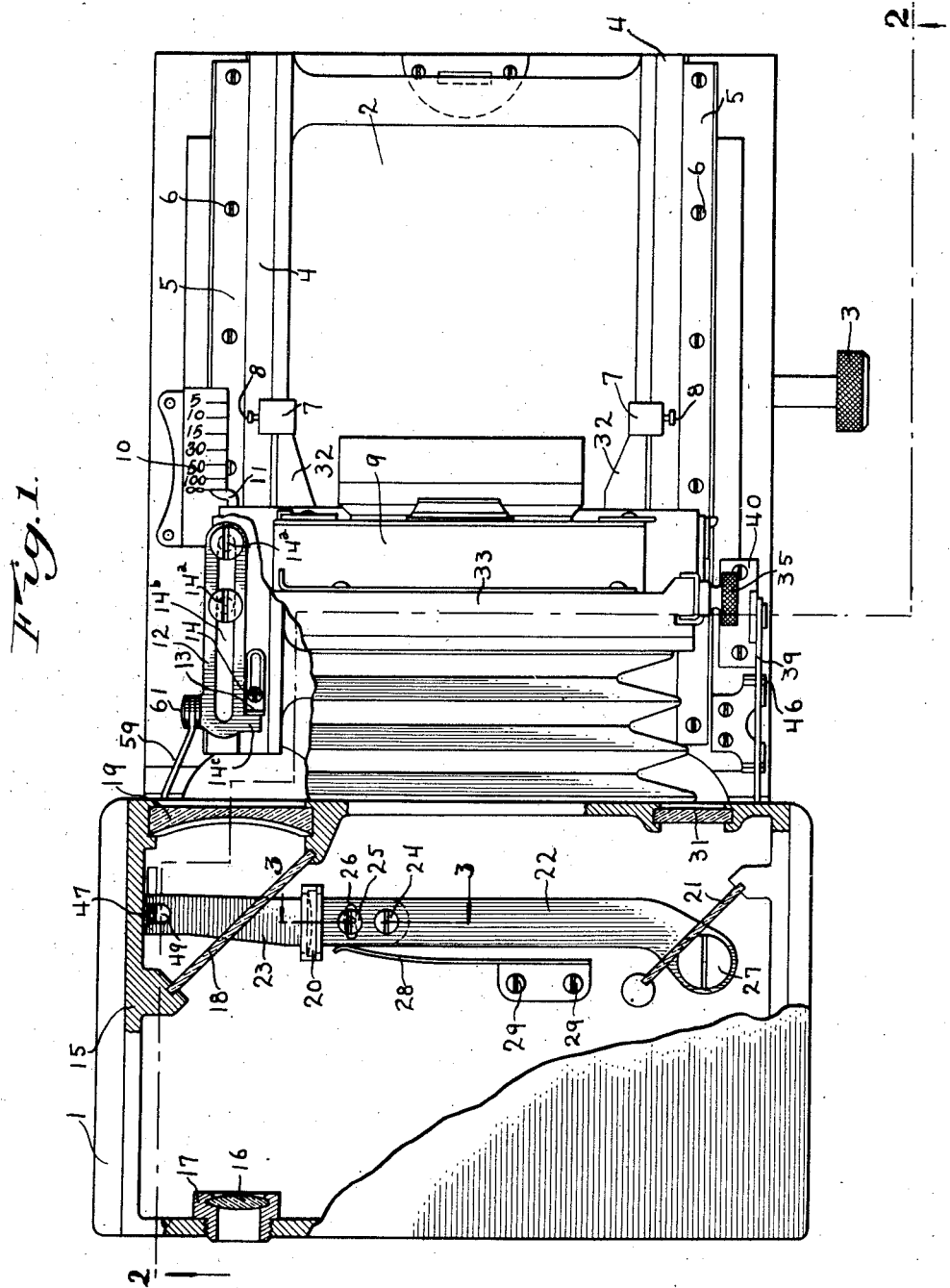
Fig. 1 is a top plan view of the camera with part of the casing thereof broken away to show the position of the parts of the range finder proper.

There have been heretofore provided numerous range finder coupling or connecting means adapted to the use of one lens only, on cameras of the general type herein disclosed. I have, however, provided, in accordance with the present invention, means for rapidly effecting the interchange of lenses mounted in customary manner upon the lens board. I provide an adjustable means under the control of the operator for rapidly adjusting the photographic mechanism so as to cause the range finder to track with whatever lens has been fitted to the camera, within reasonable focal lengths. For example, if a 4½" lens is to be used the range finder mechanism can be quickly adjusted to track with a 4½" lens, and if on the other hand a 5½" lens were substituted, a quick and simple adjustment enables the range finder to be used and to track with said 5½" lens. This is of particular importance on certain types of cameras, particularly those used in the news field where the owner of the camera may have three or four lenses that are available for use in the camera, and since there is no change made in the lens or lens barrel itself, these lenses can also be readily used on other cameras without in any way impairing their usefulness therein.

Without limiting the invention to the embodiments thereof disclosed in the drawings, I will proceed to describe specifically the said two embodiments of the invention.

The optical elements of the range finder itself may be varied. They may, for example, be the same as those disclosed in my co-pending applications Ser. Nos. 155,259 and 156,360, now Patents Nos. 2,167,435 and 2,167,436, respectively. Preferably the range finder, whatever the optical elements thereof may be, is built into or onto the camera casing, but within the scope of the invention the controlling means may be used to operate an auxiliary range finder in or on a side or part of the camera casing. Preferably, but not necessarily, the range finder is of a combined range and view finder type.

Without limiting the invention thereto, I have shown the invention as applied to a range finder having two stationary mirrors and an interposed negative lens mounted for swinging adjusting movement, and, since the operation of such a range finder is fully explained in my said co-pending applications, it is unnecessary to set forth the same fully herein.

Referring more particularly to the drawings, and first to the construction shown in Figs. 1 to 5, inclusive, the camera box or casing is indicated generally at 1, the camera bed at 2, the focusing knob at 3, the camera bed tracks at 4, 4, the camera bed track guide rails at 5, 5, the camera guide rail screws at 6, 6, the infinity stops at 7, 7, and the infinity stop lock screws at 8, 8. The shutter and lens mount is indicated generally at 9, and the focusing scale at 10, the latter being provided with a focusing scale pointer 11.

In Figs. 1 and 2 there is shown a sliding member 12 for coupling the range finder mechanism to one of the said tracks 4 by means of an adjustable dog or stop 13, which is itself held to the said track 4 by the locking screw 14, best shown in Fig. 1. The said sliding member 12, as shown best in Fig. 1, is held in place by two shoulder screws 14a, 14a, threaded into guide rail 5, but it is allowed to travel forward and backward with the movement of the camera tracks 4 inasmuch as the said member 12 has a slot 14b provided to ride along the shoulders of the screws 14a, 14a. The said sliding member 12 has a laterally extending portion 14c in contact with the said dog or stop 13. The member 12 is at all times mechanically connected to the range finder mechanism through means which will be hereinafter described.

The range finder housing is indicated generally at 15, it being herein shown as at the top of the camera inside the top wall of the camera casing. A positive range finder lens is indicated at 16, and the lens mount therefor at 17. A semi-transparent mirror is indicated at 18 and, in this embodiment of the invention, it is fixedly supported. A fixed negative lens is shown at 19 and a movable negative lens at 20. An opaque, first surface mirror is indicated at 21, it also being fixedly mounted.

The said negative lens 20 is suitably mounted as hereinafter described on the range finder movable lens arm 22. The said arm 22 has a movable arm extension 23, best shown in detail in Fig. 3 as attached to the arm 22 by screws 24 and 25. The said arm 22 is provided with a transverse arcuate slot 26 which allows a turning adjustment of the arm 23 with respect to the alignment of the arm 22. The purpose of this construction is to permit for correcting the infinity position of the range finder. The said movable arm 22 is pivoted on a shoulder screw 27 suitably received in the camera casing or structure, and said arm is free to move thereon. The said range finder arm assembly 22, 23 is caused to keep a forward position under pressure of the leaf spring 28 held to the range finder housing 15 by screws 29, 29. The lens 20 is held to the said movable arm 22 preferably at the end thereof by the lens mounting member 30, best shown in Fig. 3. In Fig. 1 a glass window is represented at 31 through which the image of the object to be photographed is viewed. Thus, a combined range and view finder is provided, the structure of which may be suitably varied within the scope of my invention.

As best shown in Fig. 1 track shoes 32, 32 are attached to the camera front support, itself best shown in Fig. 2 where the general structure of the camera front member or assembly is indicated at 33. The said member is adjustable vertically on side bars 34, one of which is shown in Fig. 2, and is locked in adjusted position by locking screws 35. The said side bar 34 is connected to the said track shoe 32 by a suitable plate member. The front of the camera is, however, adjustable with respect to the tracks 4, and it can be moved forward or back along said tracks by depressing the front lock 37. The camera front can be further adjusted by turning the focusing knob 3, thereby causing the tracks 4, 4, to be moved forward or backwards, carrying the camera front member 33 with them. The said infinity stops 7, 7 on the tracks 4 limit the position of the camera front with respect to said tracks by the contacting of the track shoes 32, 32 with said infinity stops 7, 7. The camera bed 2 is hinged to the camera body 1 by hinges, one of which is shown at 38 in Fig. 2, and is held in position by the side arm bracket 39, clearly shown in Fig. 2 as attached to the camera bed by bracket 40 and shoulder rivet 41 and held in locked position by the spring 42.

In order to connect the movable element of the range finder with the camera operating mechanism, and particularly with the supporting or operating means for the camera front member or assembly, I have provided the following means to which, however, my invention is not restricted.

To one of the side walls of the camera housing 1, as best shown in Figs. 2 and 4, there is attached an upright plate member 43 which is held to the camera housing by screws 44, 44. To the said plate member 43 is attached a movable arm 45 pivoted to the said plate 43 by a shoulder rivet 46 and extending directly upward. At its upper end, it has an upwardly extending finger 47, shown as of reduced diameter and as passing through a slot 48 in the bottom of the range finder housing 15, and thence into engagement with a slot 49 in the movable member or arm 22, 23 of the range finder, as clearly shown in Fig. 1. Connected to the arm 45 through a link 50, shown in Figs. 2 and 4, by a shoulder rivet 51 and an adjusting screw 52, is a second movable arm 53 pivoted on the shoulder rivet 54 and thereby held to the plate 43. The said plate 43 has a cut-out portion 91 plainly shown in Figs. 2 and 4, to clear the shoulder rivet 51.

On the lower end of the said arm 53 is an arm 55 hinged to said arm 53 by a shoulder rivet 56 and held in contact with a boss 57 extending from the arm 53. The said arm 55 is held under tension by a suitable spring 58 but is free to swing away from the boss 57 against the tension of the spring 58. The said arm 55 is connected to the sliding plate member already described and as best shown in Fig. 1, by means of a link 59 secured by shoulder rivets 60, 61 to the said arm 55 and member 12 respectively. There is preferably provided a stop pin 92, shown in Fig. 2, to limit the motion of the arm 53 when closing the camera.

As clearly shown in Fig. 3, the lens 20, described as supported within a member 30, is attached in position by means of screw 62, 62.

In Fig. 4, which is a detail showing certain of the parts in a different position from Fig. 2, the camera is to be understood as adjusted for a different focal length from that being used in Fig. 2. The link or member 50 is clamped or adjusted in position to and with relation to the arm 45 in Fig. 4, so as to be in the correct position for a 4½" lens. In Fig. 2 the link or member 50 is clamped in the correct position to track with a 5" lens.

Fig. 5 shows the construction of the arm assembly and therein the link 50 is represented as carrying a stud 63 riveted thereto and passing through an arcuate slot 66 in the said plate member 43, as shown also in Figs. 2 and 4, so as to be movable vertically in the said arm 45 itself, shown in Figs. 2 and 4 as having a lengthwise extending arcuate slot 64. It will be readily understood that by changing the position of the link 50 the degree or extent of movement of the arm 45 can be varied with respect to the movement of the arm 53. The movement of the lens for focusing between infinity and a close distance is relatively greater in a longer lens than in a shorter one, and as the focal length of the lens becomes greater, means for adjusting the movement of the range finder so as to track with the lens is necessary. The movement of the range finder arm 22, 23 will always be the same. That is to say, if it requires a movement of ⅛" for the said arm to cover distances between four feet and infinity, such movement will maintain regardless of what focal length lens is used. On the other hand a 4½" lens will have a movement of roughly 1/16" from four feet to infinity, whereas a 5½" lens will have a movement of approximately 5/8" for the same distances. Therefore, it is necessary to change the ratio of movement between the camera lens and the range finder arm 22, 23, so that in both instances the total movement of the lens when using a 4" lens and the total movement of the lens when using a 5½" lens will cause the member 22, 23 to be moved always the same distance. Means for accomplishing this result constitutes an important feature or part of my invention.

It will be readily understood that with the described mechanism, it is a quite simple matter for the operator to adjust the range finder to track with any of the focal length lenses that are apt to be used upon the camera, merely by loosening the nut 52 of Figs. 2, 4 and 5, and selecting a position for the said link or member 50 that, for accuracy of adjustment, has a pointer 67 on the outermost end or edge thereof. The said pointer 67 in its adjusting movement passes across a scale 68 which is shown as graduated for lenses of different focal length. For example, if the operator wishes to use a 4" lens, he loosens the nut 52 and sets the pointer 67 to the Figure 4 on said scale 58. The range finder will then track with the 4" lens. If the operator then wishes to use a 6" lens, he would change the position of the pointer 67 by moving it to the indication 6 on the scale 68, and then the range finder would track with a 6" lens.

As already set forth, the sliding plate member 12 is connected to the range finder mechanism through the connecting link 59, shown in both Figs. 1 and 2, and the said link 59 is caused to be thrust forward together with the laterally extending portion 14c and contacts with the upturned dog 13 on the track 4 as the lens travels forward and backward within the limit of the range finder. However, if the operator wishes to focus on an object nearer than that distance as marked on the focusing scale and which is the distance for which the range finder is adjusted, he is free to do this by racking the camera bed 2 forward by means of the focusing screw 3, in which case the dog or stop 13 leaves or becomes spaced from the said laterally projecting portion 14c of the member 12, and focusing can then be done by scale or according to the ground glass method.

However, when the tracks 4 are again returned to the nearest distance for which the range finder is adjusted, the said adjustable dog or stop 13 contacts with the laterally projecting portion 14c and thus automatically connects the range finder mechanism or again renders it operative.

As has been previously disclosed, the arm 55 is free to move to the position indicated in dotted lines in Fig. 2. This is the necessary position when the camera is closed. That is to say, the front of the camera is first moved all the way back until the camera front and the shutter and lens mount 9 are wholly within the camera casing 1. The bed 2 can be then swung upward on the hinges 38, thus constituting a door. The arm 55 will be pushed to the rear against the tension of the spring 58 by the action of the connecting link 59. The arm 53 is prevented from moving beyond the position shown in Fig. 2 by the stop pin 92. When the camera is again opened, the parts will resume the position shown in Fig. 2 and the camera is immediately ready for operation.

The foregoing constitutes one embodiment of the structure of my invention. However, the same optical elements herein shown and the disclosed mode of using them, can also be used with a camera that has a cam portion on the rearmost part of the lens barrel for causing the lens 20 to be moved across the face of the semi-transparent mirror 18. A construction for this purpose is shown in Figs. 6 and 7, wherein also the stationary mirrors 18 and 21 are provided.

In the alternative construction represented in Figs. 6 and 7, an arm 72 is pivoted on a shoulder screw 73 and is caused to swing forward under the influence of the spring 74 which is anchored against a pin 75. On the arm 72 is carried a lens mounting holder 76 itself carrying the lens 20. In Fig. 7, which is a cross sectional showing through said camera wall or casing, the said arm 72 is shown as attached to the casing 15 of the range finder housing by the shoulder screw 73. The lower portion of the said wall 15 of the range finder housing is provided with a hub 77 and carries a cam follower 78 pivoted on the shoulder screw 79. The cam follower arm 78 has a slot 80 in which a pin 81 is free to travel. The said pin 81 is riveted to an adjusting plate 82 provided with two slots 83, 83 and held to the said arm 72 by shoulder screws 84, 84. The arm or member 72 also has a slot 85, shown in Fig. 7, along which the pin 81 is free to move when the adjusting plate 82 is moved forward or back.

On the lens barrel 86 is a cam 87 and on the cam follower 78 is a roller 88 carried on shoulder rivet 89. The cam follower roller 88 is caused to follow the cam face 87 by the said spring 74 as already stated. If the lens barrel 86 is caused to rotate through 180° for focusing the cam face 87 is such that the lens 20 will in such case be moved through its proper distance during those 180° of movement, which correspond to a focal adjustment of the lens from three feet to infinity. The range finder lens 20 thus will track with the focusing mount.

Since it is impossible to hold the focal length of lenses to exact limits, the distance traveled by the lens 20 will vary with different lenses whose focal length may vary as much as 1/8", thus providing an adjustment of the adjusting plate 82 carrying the pin 81, and the fulcrum of the cam follower 78 can be adjusted in relation to the fulcrum that the pin 88 provides in the member 72. Thus, whatever the focal length of the lens, and whatever is the distance of travel of the lens barrel 86 (which travels forward and backward at the same time that it turns through 180°), the distance of movement of the lens 20 can be adjusted to compensate for any distance in movement of the lens barrel 86. This provides a ready means for accomplishing the tracking of the range finder with the focal adjustment of the lens. The cam face 87 will vary with the different focal length lenses. That is to say, if a lens is used whose focal length is exactly 50 mm., the movement of the lens barrel 86 forward and back through the operation of focusing, will be sufficient to move the lens 20 the necessary distance for range finder tracking. If, however, a 35 mm. lens be used a cam with a receding face should be attached to the end of lens barrel 86. It will be understood that the movement in focusing a 35 mm. lens would not be sufficient to move the lens 20 of Fig. 6 through a sufficient range to cover the distances of three feet to infinity. Therefore, an additional movement is necessary, and this is provided as hereinafter explained. When the lens barrel 86 is rotated to focus the lens, the roller 88 will follow the end of the lens barrel. Since this distance is less than that distance required to move lens 20 sufficiently, the receding portion of cam face 87 must be added to the movement of the lens when focusing. If, for instance, a lens of 75 mm. were to be used, the movement of barrel 86 would be too great for that movement of lens 20 which in that case would travel too far. Therefore a raised cam face 87 will be added to lens barrel 86 and the said raise of cam face 87 will be subtracted from the movement of lens barrel 86 in focusing, thereby moving roller 88 a sufficient distance properly to move lens 20 the required distance for the range of three feet to infinity.

In accordance with this part of my invention, I provide a means of transferring a lineal motion to a pivoted arm with a means of varying the ratio of the movement of the cam follower and the movement of the negative lens carrying member.

The reason behind this structure is that no two lenses, even if they are specified as of equal focal length, are exactly the same in that respect. One may be minus a rather small dimension, such as .0050" with respect to the true focal length, or it may be plus .0050" with respect thereto. This change will mean that the total travel of cam follower roller 88 will be a different distance with such lenses under the same condition of picture taking (i. e., a shorter distance with a lens which is to the negative side of the proper dimension, but a greater distance with a lens on the positive side of the proper dimension). Yet negative lens 20 always has to move exactly the same distance when the lens is moved to correspond to given distances, as, for instance, three feet to infinity.

Therefore, it is necessary to vary or modify the movement of roller 88 so that negative lens 20 always travels precisely the same amount when the lens is moved throughout its range, as previously stated. It will be seen that the ratio of the movement of cam follower arm 78 with relation to lens arm 72 will depend upon the position of pin 81 in slot 80 of the said cam follower arm 78 with respect to the pivot 79 of said cam follower arm 78.

This structure is for a specifically different purpose than the structure shown in Fig. 2 (though presenting the same generic idea of adjusting the range of movement of an element of an optical group of a range finder, such as a negative lens between two mirrors), in that the structure shown in Fig. 2 is to provide a greater range of adjustment, so as to take care of lenses of intentionally different focal length (as, for example, a lens of four inches focal length, or one of eight inches focal length), and has means whereby the camera operator can readily make this adjustment. The mechanism shown in Figs. 6 and 7 is only adjusted at the time of installation or assembly to take care of unintentional variance in lenses as they are manufactured and this ratio of adjustment is relatively small.

It will be understood from the foregoing description that the construction described constitutes a distinct advance in the art with respect to range finders or combined range and view finders as applied to photographic cameras having interchangeable lenses.

Having thus described one illustrative embodiment of the invention, it is to be understood that although specific terms are employed, they are used in a generic and descriptive sense, and not for purposes of limitation, the scope of the invention being set forth in the following claims.

I claim:

1. Focusing mechanism for determining the position of the objective lens of the camera so that it shall focus on the plate or film of the camera objects at varying distances from the said objective lens of the camera, including a camera casing having a movable objective lens, said objective lens being interchangeable with others of different focal length, a range finder attached to the camera casing within a range finder housing so as to be a part of the camera structure and having optical elements at least one whereof is movable, said housing extending in general parallelism to and adjacent the top wall of the camera casing and transversely thereof, a member movably mounted in said camera casing in general parallelism to the top wall of the casing and carrying said movable optical element, mechanical connections between said movable element and the support for the movable objective lens, said mechanical connections including a pivoted arm 45 mounted in the camera casing outside said housing and connected to the said movably mounted member carrying said movable optical member of the range finder within said housing, a second pivoted arm 53, also in said camera casing, adjustable connections between the arms 45 and 53, being adjustably connected to said pivoted arm 45 at varying distances from the pivot of said arm 45 in order to vary the ratio of movement of said arm 45 to accord with the focal length of the objective lens, and a link connecting said arm 53 with the movable support for the objective lens, said arms 45 and 53 and said adjustable connections therebetween extending in general parallelism to a side wall of the camera casing.

2. Focusing mechanism for determining the position of the objective lens of the camera so that it shall focus on the plate or film of the camera objects at varying distances from the said objective lens of the camera, including a camera casing having a movable objective lens, a camera bed track supporting said objective lens and movable to and fro for focusing said lens, a range finder mounted in a range finder housing that is attached to the camera casing so as to be a part of the camera structure and having therein optical elements at least one whereof is movable, said housing extending in general parallelism to and adjacent the top wall of the camera casing and transversely thereof, a member movably mounted in said camera casing in general parallelism to the top wall of the casing and carrying said movable optical element, a slidable member 12 for coupling said bed track to the movable optical element, a link 59 pivotally connected to said sliding member 12, a pivoted arm 45 mounted in the camera casing and connected to the said movably mounted member carrying said movable optical element of the range finder through a wall of said housing, a bar link 50 operatively connected to the link 59, said link 50 being connected to the pivoted arm 45 between the ends of the latter, such connection being adjustable, under the ready control of the operator, along said arm 45, to increase or diminish the movement of said arm 45 with respect to a given movement of the movable objective lens, in accordance with the focal length of the lens employed, said arm 45 and bar-link 50 extending in general parallelism to a side wall of the camera casing.

3. A photographic camera including a camera casing having a movable support for interchangeable objective lenses thereof; a combined view and range finder and housing therefor built into the camera casing just below and extending transversely of the top wall of the said camera casing; a semi-transparent mirror and a first-surface mirror both stationarily mounted in said housing at opposite end parts thereof and cooperating viewing elements adjacent said mirrors respectively; a negative lens within said housing between said mirrors; a lever within said housing whereon said negative lens is mounted for movement transverse to a right line through said mirrors; a pair of levers within the camera casing below said housing and extending upward in substantial parallelism along a side wall of the camera casing, one of them being connected to said negative lens lever through a wall of said housing, a link-bar connecting said pair of levers, the connection thereof to one of said levers being an adjustable one so that the ratio of movement of said pair of levers may be varied to accord with different focal length objective lenses on said movable support; and mechanical connections from one lever of said pair of levers to the said movable support for the objective lens.

4. A photographic camera including a camera casing having a movable support for interchangeable objective lenses thereof; a combined view and range finder and housing therefor built into the camera casing just below and extending transversely of the top wall of the said camera casing; a semi-transparent mirror and a first-surface mirror both stationarily mounted in said housing at opposite end parts thereof and cooperating viewing elements adjacent said mirrors respectively; a negative lens within said housing between said mirrors; a lever within said housing whereon said negative lens is mounted for movement transverse to a right line through said mirrors; a pair of levers within the camera casing below said housing and extending upward in substantial parallelism along a side wall of the camera casing, one of them being connected to said negative lens lever through a wall of said housing, one lever of said pair of levers having a slot lengthwise thereof; a link-bar connecting said pair of levers and at one end adjustable along said slot so that the ratio of movement of said pair of levers may be varied to accord with different focal length objective lenses on said movable support; and mechanical connections from one lever of said pair of levers to the said movable support for the objective lens.

5. A photographic camera including a camera casing having a movable support for interchangeable objective lensees thereof; a combined view and range finder and housing therefor built into the camera casing just below and extending transversely of the top wall of the said camera casing; a semi-transparent mirror and a first-surface mirror both stationarily mounted in said housing at opposite end parts thereof and co-operating viewing elements adjacent said mirrors respectively; a negative lens within said housing between said mirrors; a lever within said housing whereon said negative lens is mounted for movement transverse to a right line through said mirrors; a pair of levers within the camera casing below said housing and extending upward in substantial parallelism along a side wall of the camera casing, one of them being connected to said negative lens lever through a wall of said housing, one lever of said pair of levers having a slot lengthwise thereof; a plate secured to a side wall beneath said housing, and whereon both levers of said pair of levers are pivoted, a link-bar connecting said pair of levers and at one end adjustable along said slot so that the ratio of movement of said pair of levers may be varied to accord with different focal length objective lenses on said movable support; and mechanical connections from one lever of said pair of levers to the said movable support for the objective lens.

6. A photographic camera including a camera casing having a movable support for interchangeable objective lenses thereof; a combined view and range finder and housing therefor built into the camera casing just below and extending transversely of the top wall of the said camera casing; a semi-transparent mirror and a first-surface mirror both stationarily mounted in said housing at opposite end parts thereof and cooperating viewing elements adjacent said mirrors respectively; a negative lens within said housing between said mirrors; a lever within said housing whereon said negative lens is mounted for movement transverse to a right line through said mirrors; a pair of levers within the camera casing below said housing and extending upward in substantial parallelism along a side wall of the camera casing, one of them being connected to said negative lens lever through a wall of said housing, a link-bar connecting said pair of levers, the connection thereof to one of said levers being an adjustable one so that the ratio of movement of said pair of levers may be varied to accord with different focal length objective lenses on said movable support; a member slidable with the camera bed tracks along the track guide rails, and mechanical connections including link 59 at all times mechanically connecting one lever of said pair of levers and said slidable member.

7. A photographic camera including a camera casing having a movable support for interchangeable objective lenses thereof; a combined view and range finder and housing therefor built into the camera casing just below and extending transversely of the top wall of the said camera casing; a semi-transparent mirror and a first-surface mirror mounted in said housing at opposite end parts thereof and co-operating viewing elements adjacent said mirrors respectively; a negative lens within said housing between said mirrors; one of said three optical elements, namely said two mirrors and said negative lens, being mounted for movement with respect to the other two optical elements in the range finding operation; a pair of levers within the camera casing below said housing and extending upward in substantial parallelism along a side wall of the camera casing, one of them being connected to the said movable optical element of the range finder through a wall of said housing; a link-bar connecting said pair of levers, the connection thereof to one member of said pair of levers being an adjustable one so that the ratio of movement of said pair of levers may be varied to accord with different focal length objective lenses on said movable support; and mechanical connections from one lever of said pair of levers to the said movable support for the objective lens.

8. A photographic camera including a camera casing having a movable support for the objective lens thereof; a combined view and range finder and housing therefor built into the camera casing and extending transversely of the top wall of the said camera casing; a semitransparent mirror and a first-surface mirror both stationarily mounted in said housing at opposite end parts thereof and cooperating viewing elements adjacent said mirrors respectively; a negative lens within said housing between said mirrors; a lever within said housing whereon said negative lens is mounted for movement transverse to a right line through said mirrors; a pivoted arm mounted upon a fixed portion of the camera and having a positive connection to said negative lens lever, said pivoted arm being provided with a lengthwise extending slot, a controlling part connected to the movable support for the objective lens and moved thereby, said part having a manual adjustment portion received in said slot, said portion being directly accessible to the operator for manual adjustment thereof by him along said slot, so that in accordance with its different positions of such adjustment along said slot to compensate for focal length differences, a different movement is in consequence imparted to said negative lens lever, in photographing under the same conditions with different objective lenses.

9. Focusing mechanism for cameras for determining the position of the objective lens thereof, so that it shall focus on the plate or film of the camera objects at varying distances from the objective lens, including a camera casing having an objective lens and a movable support therefor, said objective lens being interchangeable with others of different focal length, a range finder attached to the camera casing so as to be a part of the camera structure and having optical elements at least one whereof is movable, said range finder as an entirety extending in general parallelism to the top wall of the camera casing and transversely thereof, a member movably mounted in the casing for movement substantially parallel to the top wall of the casing and carrying said optical element, and a mechanical linkage between said movable member carrying said movable optical element and the movable support for said objective lens, said mechanical linkage including a lever arm pivoted in the camera casing and connected to the said movable member carrying said movable optical element, a link-bar connected to the said lever arm between its ends, and adjustable at its said point of connection toward and from the pivot of said lever arm, said lever arm and link-bar extending in general parallelism to a side wall of the camera casing, said linkage also including a member to which said link-bar is also connected, and means mechanically connecting said member to the movable support for the said objective lens.

10. Focusing mechanism for cameras for determining the position of the objective lens thereof so that it shall focus on the plate or film of the camera objects at varying distances from the said objective lens, including a camera casing having an objective lens and a movable support therefor, said objective lens being interchangeable with others of different focal length, a range finder attached to the camera casing so as to be a part of the camera structure and having optical elements at least one whereof is movable, said range finder as an entirety extending in general parallelism to the top wall of the camera casing and transversely thereof, a member movably mounted in the casing for movement substantially parallel to the top wall of the casing and carrying said optical element, and a mechanical linkage between said movable member carrying said movable optical element and the movable support for said objective lens, said mechanical linkage including a lever arm pivoted in the camera casing and connected to the said movable member carrying said movable optical element, a link-bar connected to the said lever arm between its ends, and adjustable at its said point of connection toward and from the pivot of said lever arm, an indicating scale adjacent the point of adjustable connection of said link-bar and lever arm, said lever arm and link bar extending in substantial parallelism to a side wall of the camera casing, said linkage also including a movable member to which said link-bar is also connected, and means mechanically connecting said member to the movable support for the said objective lens.

11. Focusing mechanism for cameras for determining the position of the objective lens thereof so that it shall focus on the plate or film of the camera objects at varying distances from the said objective lens, including a camera casing having an objective lens and a movable support therefor, said objective lens being interchangeable with others of different focal length, a range finder attached to the camera casing so as to be a part of the camera structure and having optical elements at least one whereof is movable, said range finder as an entirety extending in general parallelism to the top wall of the camera casing and transversely thereof, a member movably mounted in the casing for movement substantially parallel to the top wall of the casing and carrying said optical element, and a mechanical linkage between said movable member carrying said optical element and the movable support for said objective lens, said mechanical linkage including a lever arm pivoted in the camera casing and connected to the said movable member carrying said movable optical element, a link-bar connected to the said lever arm between its ends, and adjustable at its said point of connection toward and from the pivot of said lever arm, said lever arm and link bar extending in substantial parallelism to a side wall of the camera casing, the said camera casing having a hinged wall to constitute a bed when opened out and along which the support for the said objective lens is movable, and mechanical connections between said link-bar and said movable support for the objective lens, permitting the closing of said hinged wall without disconnecting said mechanical linkage, said mechanical connections including a lever arm 53 to which said link-bar is also connected, and a member having a swinging movement connected to said lever arm 53 and to the movable support for the said objective lens, so as, during the opening out and the closing of the said camera wall-bed, to swing in the camera casing without requiring disconnection.

12. A photographic camera including a camera casing having a movable support for interchangeable objective lenses thereof, a combined view and range finder and housing therefor built into the camera casing along the top wall thereof, optical elements in said housing, one of which is movable, a lever pivotally mounted substantially parallel to the longitudinal walls of the housing, said lever being within said housing to which said movable optical element is mechanically connected so as to be moved by the movement of said lever, a pair of levers pivotally mounted within the camera casing and extending upward in substantial parallelism adjacent a side wall of the camera casing and substantially normal to said housing, one of said levers being connected to the said lever within the said housing, a link-bar connecting said pair of levers, the connection thereof to one of said levers being an adjustable one, so that the ratio of movement of said pair of levers may be varied to accord with different focal length objective lenses on said movable support, and mechanical connections from one lever of said pair of levers to the said movable support for the objective lens.

13. A photographic camera including a camera casing having a movable support for interchangeable objective lenses thereof, a combined view and range finder and housing therefor built into the camera casing along the top wall thereof, optical elements in said housing, one of which is movable, a lever pivotally mounted substantially parallel to the longitudinal walls of the housing, said lever being within said housing to which said movable optical element is mechanically connected so as to be moved by the movement of said lever, a pair of levers pivotally mounted within the camera casing below said housing and extending upward in substantial parallelism adjacent a side wall of the camera casing and substantially normal to said housing, one of said levers being connected to said lever within the housing through a wall of said housing, one lever of said pair of levers within the camera casing having a slot lengthwise thereof, a link-bar connecting said pair of levers and at one end adjustable along said slot, so that the ratio of movement of said pair of levers may be varied to accord with different focal length objective lenses on said movable support, and mechanical connections from one lever of said pair of levers to said movable support for the objective lens.

EDSON S. HINELINE.